(12) United States Patent
Bhogal et al.

(10) Patent No.: US 9,754,234 B2
(45) Date of Patent: Sep. 5, 2017

(54) TRACKING OF SHARED INVENTORY IN A VIRTUAL UNIVERSE

(75) Inventors: Kulvir S. Bhogal, Fort Worth, TX (US); Rick A. Hamilton, II, Charlottesville, VA (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 2500 days.

(21) Appl. No.: 12/032,488

(22) Filed: Feb. 15, 2008

(65) Prior Publication Data

US 2009/0210324 A1 Aug. 20, 2009

(51) Int. Cl.
*G06Q 10/08* (2012.01)

(52) U.S. Cl.
CPC .................. *G06Q 10/087* (2013.01)

(58) Field of Classification Search
CPC ..................................................... G06Q 10/087
See application file for complete search history.

(56) References Cited

U.S. PATENT DOCUMENTS

| | | |
|---|---|---|
| 5,615,373 A | 3/1997 | Ho |
| 6,119,229 A * | 9/2000 | Martinez ................ A63F 13/12 726/28 |
| 6,476,830 B1 | 11/2002 | Farmer et al. |
| 6,514,144 B2 | 2/2003 | Riendeau et al. |
| 6,753,857 B1 | 6/2004 | Matsuura et al. |
| 6,941,184 B2 | 9/2005 | Ebert |
| 7,069,228 B1 | 6/2006 | Rose et al. |
| 7,257,552 B1 | 8/2007 | Franco |

(Continued)

FOREIGN PATENT DOCUMENTS

WO 9607151 A1 3/1996

OTHER PUBLICATIONS

Blizzard Entertainment: World of Warcraft, "Guild Banks" (Internet Archived Content: Guild Banks found at www.worldofwarcraft.com/info/basics/guildbanks.html), Feb. 4, 2008, pp. 1-3.*

(Continued)

*Primary Examiner* — Asfand Sheikh
(74) *Attorney, Agent, or Firm* — Schmeiser, Olsen & Watts, LLP; Issac J. Gooshaw

(57) ABSTRACT

Generally speaking, systems, methods and media for tracking shared inventory in a virtual universe are disclosed. Embodiments of the method may include receiving indications that a plurality of users of a virtual universe have borrowed one or more shared inventory items, each shared inventory item having an associated item owner. Embodiments may also include determining and storing metadata associated with borrowing of the shared inventory items and tracking usage of the borrowed shared inventory items by the plurality of the users. Embodiments may also include receiving a query requesting performance of an action relating to one or more shared inventory items and performing the requested action relating to the one or more shared inventory items. In further embodiments, performing the requested action may include recalling the borrowed shared inventory item and returning it to an item owner associated with the borrowed shared inventory item.

22 Claims, 6 Drawing Sheets

(56) References Cited

U.S. PATENT DOCUMENTS

| | | | |
|---|---|---|---|
| 7,277,896 B2 | 10/2007 | Matsubara et al. | |
| 7,587,338 B2 | 9/2009 | Owa | |
| 7,666,095 B2 | 2/2010 | Van Luchene | |
| 7,713,116 B2* | 5/2010 | Keam et al. | 463/1 |
| 8,018,462 B2 | 9/2011 | Bhogal et al. | |
| 8,145,676 B2 | 3/2012 | Bhogal et al. | |
| 2002/0002541 A1* | 1/2002 | Williams | G06F 21/10 705/51 |
| 2002/0029179 A1 | 3/2002 | Gruber et al. | |
| 2002/0052756 A1 | 5/2002 | Lomangino | |
| 2002/0059120 A1 | 5/2002 | Milton | |
| 2002/0107701 A1 | 8/2002 | Batty et al. | |
| 2005/0021353 A1 | 1/2005 | Aviles et al. | |
| 2005/0137015 A1* | 6/2005 | Rogers | A63F 13/12 463/42 |
| 2005/0261980 A1 | 11/2005 | Hadi | |
| 2007/0033279 A1 | 2/2007 | Battat et al. | |
| 2007/0052702 A1 | 3/2007 | Trotta et al. | |
| 2007/0075993 A1 | 4/2007 | Nakanishi et al. | |
| 2007/0118420 A1 | 5/2007 | Jung et al. | |
| 2007/0219949 A1 | 9/2007 | Mekikian | |
| 2007/0293319 A1* | 12/2007 | Stamper | A63F 13/12 463/42 |
| 2008/0065514 A1* | 3/2008 | Eaton | G06Q 10/087 705/26.3 |
| 2008/0109910 A1* | 5/2008 | Day | G06F 21/10 726/27 |
| 2008/0204448 A1 | 8/2008 | Dawson et al. | |
| 2009/0158161 A1* | 6/2009 | Gibbs et al. | 715/733 |

OTHER PUBLICATIONS

Champagne, Luna, Non-Final Office Action; mail date May 11, 2010; published by the USPTO in utility U.S. Appl. No. 12/032,464, pp. 18.

Fan, Shiow-JY, Non-Final Office Action; mail date May 7, 2010; published by the USPTO in utility U.S. Appl. No. 12/029,194, pp. 16.

Ortiz Roman, Denisse Y., Non-Final Office Action: mail date Apr. 16, 2010; published by the USPTO in utility U.S. Appl. No. 12/028,918, pp. 16.

Kulvir S. Bhogal, et al. as Applicants, Amendment Accompanying RCE, mail date Feb. 23, 2010, published by Applicants in utility U.S. Appl. No. 12/028,918, pp. 13.

Ortiz Roman, Denisse Y., Final Office Action; mail date Nov. 27, 2009; published by the USPTO in utility U.S. Appl. No. 12/028,918, pp. 14.

Kulvir S. Bhogal et al, U. S. Patent Application entitled "Maintenance of Group Shared Inventories in a Virtual Universe,", filed Feb. 11, 2008, U.S. Appl. No. 12/028,918.

Kulvir S. Bhogal et al., U. S. Patent Application entitled "Maintenance of Group Shared Inventories in a Virtual Universe,", filed Feb. 15, 2008, U.S. Appl. No. 12/032,464.

Kulvir S. Bhogal et al., U. S. Patent Application entitled "Pack Avatar for Shared Inventory in a Virtual Universe,", filed Feb. 11, 2008, U.S. Appl. No. 12/029,132.

Kulvir. S. Bhogal et al., U. S. Patent Application entitled "Shared Inventory Item Donation in a Virtual Universe,", filed Feb. 11, 2008, U.S. Appl. No. 12/029,194.

Applicant's attorney Erik Osterrieder, Response to Non-Final Office Action of U.S. Appl. No. 12/028,918, Jul. 12, 2010, Austin, TX, USA.

Final Office Action of U.S. Appl. No. 12/028,918, Aug. 5, 2010, Alexandria, VA, USA.

Applicant's attorney Erik Osterrieder, Response to Non-Final Office Action of U.S. Appl. No. 12/029,194, Aug. 5, 2010, Austin, TX, USA.

Ortiz Roman, Denisse Y., Non-Final Office Action: mail date Aug. 10, 2009; published by the USPTO in utility U.S. Appl. No. 12/028,918, pp. 17.

Office Action (Mail Date Jan. 7, 2011) for U.S. Appl. No. 12/029,132, filed Feb. 11, 2008; Confirmation No. 8207.

Office Action (Mail Date May 10, 2011) for U.S. Appl. No. 12/032,464, filed Feb. 15, 2008; Confirmation No. 4425.

Notice of Allowance (Mail Date May 11, 2011) for U.S. Appl. No. 12/029,132, filed Feb. 11, 2008; Confirmation No. 8207.

Notice of Allowance (Mail Date Sep. 16, 2011) for U.S. Appl. No. 12/032,464, filed Feb. 15, 2008; Confirmation No. 4425.

Notice of Allowance (Mail Date Nov. 21, 2011) for U.S. Appl. No. 12/029,194, filed Feb. 11, 2008; Confirmation No. 8336.

Office Action (Mail Date Jan. 30, 2012) for U.S. Appl. No. 12/028,918, filed Feb. 11, 2008; Confirmation No. 7767.

U.S. Appl. No. 14/552,526, filed Nov. 25, 2014.

Amendment filed Apr. 17, 2012 in response to Office Action (Mail Date Jan. 30, 2012) for U.S. Appl. No. 12/028,918, filed Feb. 11, 2008; Confirmation No. 7767.

Final Office Action (Mail Date May 15, 2012) for U.S. Appl. No. 12/028,918, filed Feb. 11, 2008; Confirmation No. 7767.

* cited by examiner

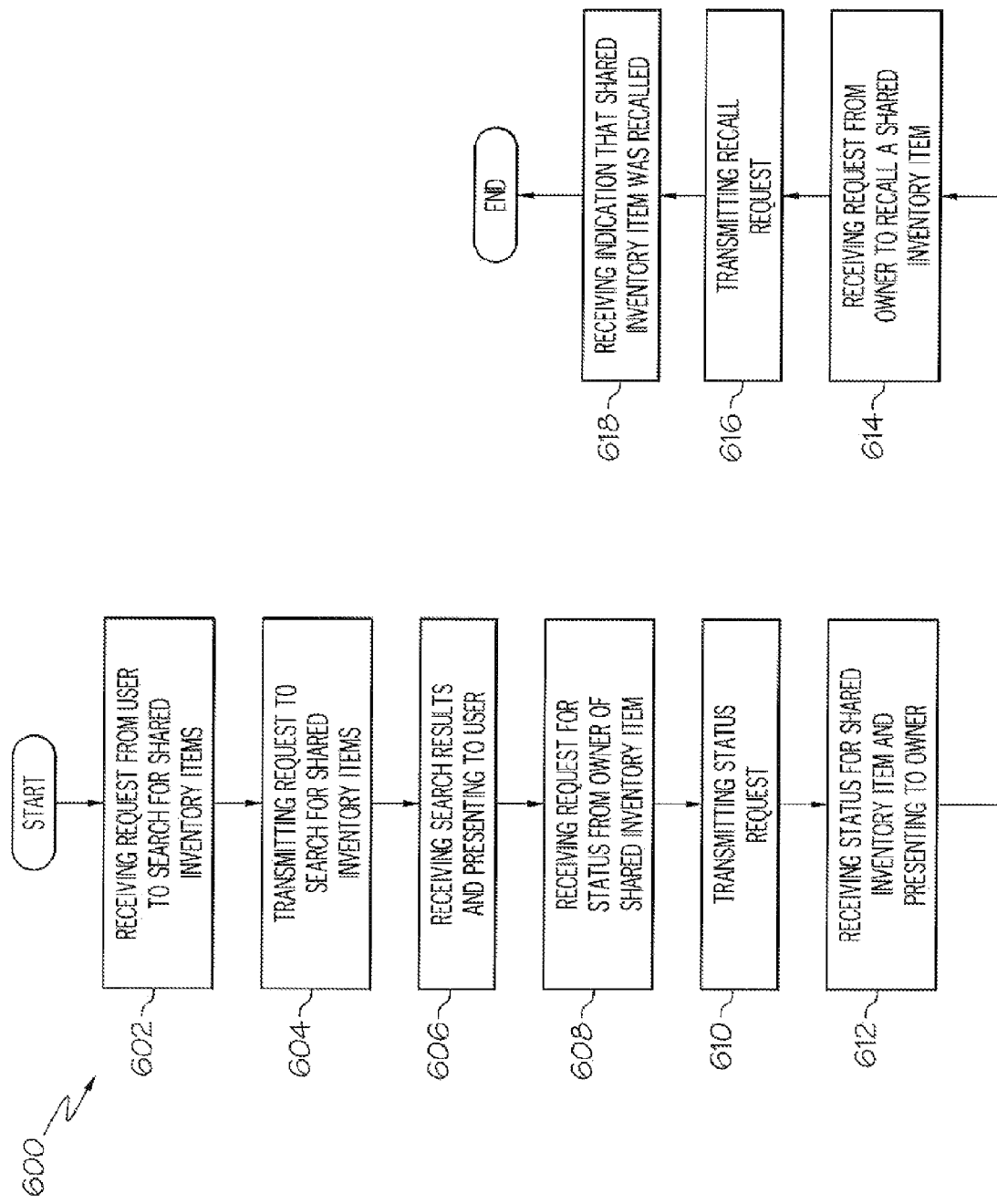

TRACKING OF SHARED INVENTORY IN A VIRTUAL UNIVERSE

FIELD OF INVENTION

The present invention is in the field of data processing systems and, in particular, to systems, methods and media for tracking shared inventory in a virtual universe.

BACKGROUND

Computer systems are well known in the art and have attained widespread use for providing computer power to many segments of today's modern society. As advances in semiconductor processing and computer architecture continue to push the performance of computer hardware higher, more sophisticated computer software has evolved to take advantage of the higher performance of the hardware, resulting in computer systems that continue to increase in complexity and power. Computer systems have thus evolved into extremely sophisticated devices that may be found in many different settings. Computer systems are often connected to the Internet or other broad-based network in order to communicate with other computer systems, access information or other resources, or perform various tasks associated with business, personal banking, electronic commerce transactions, or other endeavors.

One application for computer systems that is increasing in importance is for use in accessing virtual universes (VUs), which are also known as virtual worlds and virtual world environments (VWEs). A VU represents a real or imaginary place using graphics, images, video, auditory data, or other sensory data to define a representation on a computer system to one or more users. The hardware and software that together create a VU provide the ability for users to interact with the VU in various ways. VUs commonly allow for multiple users to simultaneously interact with the VU, allowing the users to thus interact with each other within the VU and form a community. Current VUs such as Second Life® by Linden Lab or There® by Makena Technologies provide an interactive, three-dimensional (3D) online digital world with hundreds of thousands of users accessing the world via the Internet. In these graphical VUs, users typically are represented by an avatar within the online world, and the users may command their avatar to move within the VU, communicate with other users via their avatars, etc., and thus interact with the virtual world. VUs typically allow users (using a client program on their computer system) to use various tools to view, navigate, and modify the virtual world as well as participate in its virtual economy.

VU users typically have an inventory of items that they own, and these inventory items may be bought, sold, traded, etc. during operation of the VU. Items in a typical inventory may include clothing, virtual pets, vehicles, electronic media (e.g., music files), or other possessions. Each inventory item may represent a piece of code or other data which may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical manner similar to an operating system's display of folders, subfolders, and files within a filesystem.

The current use of inventories within a VU is limited. Individuals must typically manage their own inventories, manually adding or deleting inventory items from their inventory. Also, since each inventory item often has software code necessary to render it, the stored code results in significant storage and maintenance requirements within the VU as each instance of code is stored separately. The cost of purchasing or otherwise acquiring many inventory items is also sometimes prohibitive for many users. Another problem with current inventory systems is that sharing of inventory items is not available. A user wishing to loan an inventory item to another, for example, loses control of that item, making such a loan undesirable in many cases. For items such as artwork, the owner may want to retain some control over the item. For other items where control is not as important, a copy of an item can sometimes be made in order to facilitate exchange of items but this may result in excessive use of VU resources. The lack of sharing may thus exacerbate the storage problems associated with inventory items as the code must be stored for each individual user. Managing inventories has thus become a major problem in VU space as such inventories are increasingly taken up by functional software, documents, and other such items that today reside on local drives.

SUMMARY OF THE INVENTION

The problems identified above are in large part addressed by systems, methods and media for tracking shared inventory in a virtual universe. Embodiments of the method may include receiving indications that a plurality of users of a virtual universe have borrowed one or more shared inventory items, each shared inventory item having an associated item owner. Embodiments may also include determining and storing metadata associated with borrowing of the shared inventory items and tracking usage of the borrowed shared inventory items by the plurality of the users. Embodiments may also include receiving a query requesting performance of an action relating to one or more shared inventory items and performing the requested action relating to the one or more shared inventory items. In further embodiments, performing the requested action may include recalling the borrowed shared inventory item and returning it to an item owner associated with the borrowed shared inventory item.

Another embodiment provides a computer program product comprising a computer-useable medium having a computer readable program wherein the computer readable program, when executed on a computer, causes the computer to perform a series of operations for tracking shared inventory in a virtual universe. The series of operations generally includes receiving indications that a plurality of users of a virtual universe have borrowed one or more shared inventory items, each shared inventory item having an associated item owner. Embodiments may also include a series of operations for determining and storing metadata associated with borrowing of the shared inventory items and tracking usage of the borrowed shared inventory items by the plurality of the users. Embodiments may also include a series of operations for receiving a query requesting performance of an action relating to one or more shared inventory items and performing the requested action relating to the one or more shared inventory items. In further embodiments, performing the requested action may include recalling the borrowed shared inventory item and returning it to an item owner associated with the borrowed shared inventory item.

A further embodiment provides a data processing system having a machine-accessible medium storing a plurality of program modules. Embodiments may include a virtual universe simulator interface module to facilitate communication to and from a virtual universe simulator and to receive indications that users have borrowed shared inventory items and indications of usage of borrowed shared inventory items by users. Embodiments may also include a user interface module to facilitate communication to and from a client computer system of a user and to receive queries requesting performance of actions relating to shared inventory items. Embodiments may also include a shared inventory monitor to track borrowed shared inventory items in a virtual universe. The shared inventory monitor may include an inventory tracking module to track usage of borrowed shared inventory items by borrowing users, a metadata update module to determine and store metadata associated with borrowing of shared inventory items, and a query handler module to receive and process queries requesting performance of actions relating to shared inventory items and to perform requested actions.

BRIEF DESCRIPTION OF THE DRAWINGS

Aspects of certain embodiments of the invention will become apparent upon reading the following detailed description and upon reference to the accompanying drawings in which like references may indicate similar elements:

FIG. 6 depicts an example of a flow chart for requesting a query and receiving results according to some embodiments.

DETAILED DESCRIPTION OF EMBODIMENTS

Figure 1:
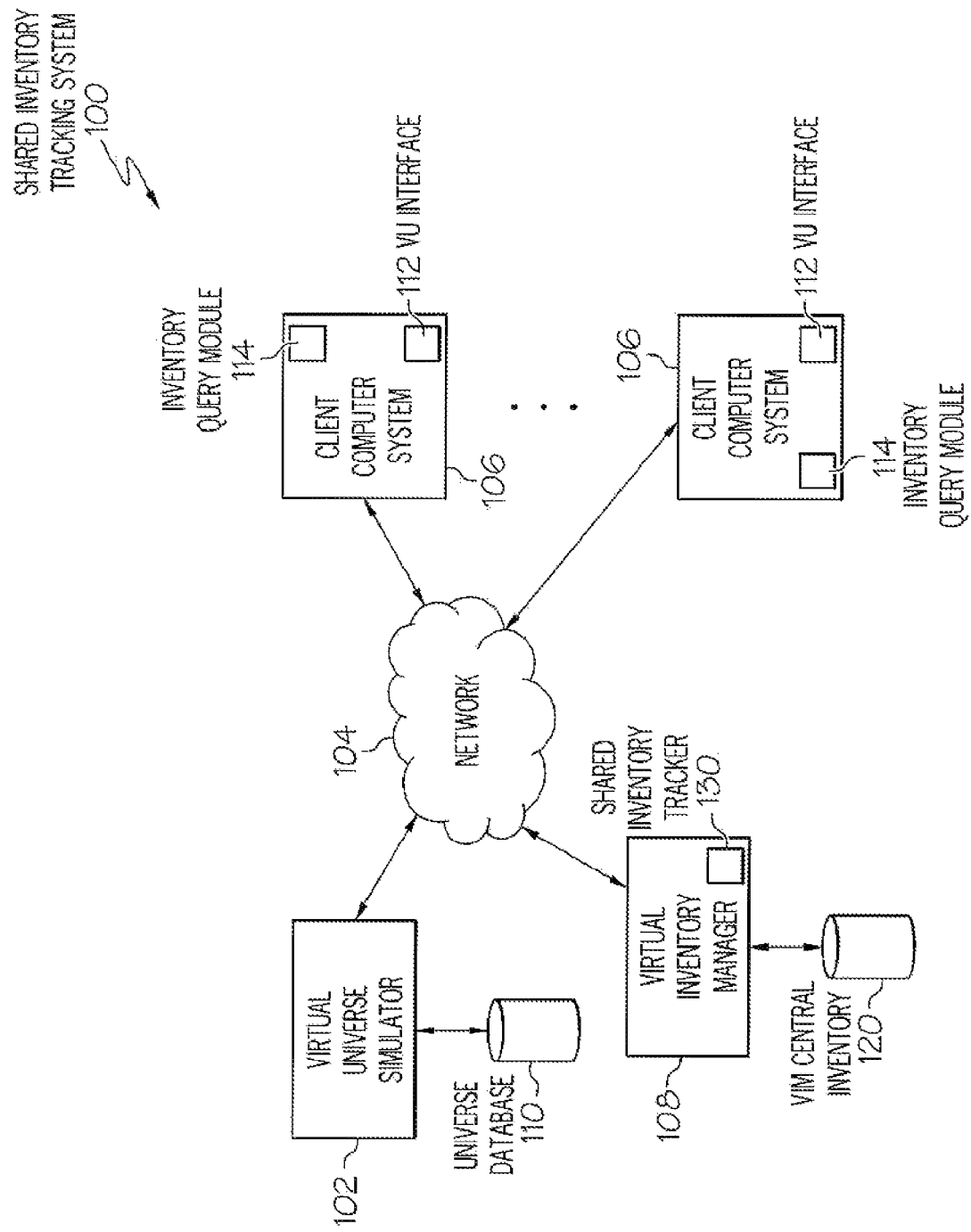
FIG. 1 depicts a shared inventory tracking system with one or more virtual universe simulators, one or more client computer systems, a virtual inventory manager, and a shared inventory tracker according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for tracking shared inventory in a virtual universe are disclosed. Embodiments of the method may include receiving indications that a plurality of users of a virtual universe have borrowed one or more shared inventory items, each shared inventory item having an associated item owner. Embodiments may also include determining and storing metadata associated with borrowing of the shared inventory items and tracking usage of the borrowed shared inventory items by the plurality of the users. Embodiments may also include receiving a query requesting performance of an action relating to one or more shared inventory items and performing the requested action relating to the one or more shared inventory items. In further embodiments, performing the requested action may include recalling the borrowed shared inventory item and returning it to an item owner associated with the borrowed shared inventory item.

The system and methodology of the depicted embodiments allow for effective and efficient tracking of shared inventory in a virtual universe. Using the disclosed system, owners of shared inventory items may track borrowed shared inventory items during their usage by borrowing users. Owners may also optionally recall a borrowed shared inventory item so that it is removed from the inventory of the borrowing user, which may be useful if the item owners desires return of the item or believes that the borrowing user is using the item improperly. In other embodiments, an automatic recall may be configured that triggers upon the occurrence of the expiration of a timeframe, the occurrence of an event, or other situation. The ability to track usage of borrowed shared inventory items and the ability to potentially recall them may provide additional incentive and comfort to users considering offering inventory items for sharing and may thus increase use of the item sharing feature in virtual universes. Users who desire to borrow a shared inventory item may also use the disclosed system to perform queries of available shared inventory items (such as those that meet specified criteria) in order to assist them in finding items that are available to borrow. One of ordinary skill in the art will recognize that the disclosed system provide a flexible, effective, and efficient methodology for tracking and retrieving borrowed shared inventory items as well as for searching for shared inventory items to borrow.

In general, the routines executed to implement the embodiments of the invention may be part of a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware, software systems, manual operations, or any combination of any or all of these. The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. Moreover, embodiments of the invention may also be implemented via parallel processing using a parallel computing architecture, such as one using multiple discrete systems (e.g., plurality of computers, etc.) or an internal multiprocessing architecture (e.g., a single system with parallel processing capabilities).

Aspects of embodiments of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device. The medium may be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts a shared inventory tracking system with one or more virtual universe (VU) simulators, one or more client computer systems, a virtual inventory manager, and a shared inventory tracker according to some embodiments. In the depicted embodiment, the shared inventory tracking system 100 includes one or more virtual universe simulators 102 in communication with a plurality of client computer systems 106 via network 104. The virtual universe simulator 102 and client computer systems 106 may also be in communication with a virtual inventory manager 108 via network 104. As will be described in more detail subsequently, a virtual universe simulator 102 may manage a virtual universe (VU) by interacting with a variety of users of client computer systems 106 and the virtual inventory manager 108 may facilitate sharing of inventory items between various users of the client computer systems 106. The virtual inventory manager 108 may also include a virtual inventory manager central inventory 120 for storage of shared inventory items, tracking or usage information, or any other type of information. The virtual inventory manager 130 may also include a shared inventory tracker 130 to facilitate tracking and retrieval of borrowed shared inventory items as well as searching for shared inventory items to borrow by users, as will be described in more detail in relation to FIG. 3.

Inventory items may be any item that may be associated with a user in a virtual universe. Inventory items may each be comprised of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a VU.

Virtual universe simulator 102 may be implemented on one or more servers or other computer systems (such as those described in relation to FIG. 2) adapted to implement all or part of a virtual universe. The virtual universe simulator 102 may be implemented, for example, on one or more application servers such as International Business Machine's (IBM®'s) WebSphere® Application Server (WAS) that may serve as middleware to set up, operate, and integrate e-business applications across multiple computing platforms using Web technologies. The virtual universe simulator 102 may provide a virtual universe to users by accessing stored information from a database and creating and operating a virtual universe based on the stored information. To accomplish this, the virtual universe simulator 102 may render the virtual universe, including a user's inventory items, on the client computer system 102 so that the user can view or otherwise experience the virtual universe. An example virtual universe simulator 102 may include massively multiplayer online games such as the Second Life® virtual world from Linden Lab or There® by Makena Technologies.

A virtual universe simulator 102 may also have a universe database 110 to store a variety of files used to create, maintain, and operate a virtual universe (collectively "environment information"), such as graphics files (e.g., buildings, avatars, landscapes, items, etc.), sound files (e.g., environmental sounds, spoken words, etc.), or text files (e.g., configuration information, descriptive information for objects, user information, etc.). The universe database 110 may also optionally include one or more shared inventory items and/or information relating to shared inventory items, such as item metadata. Shared inventory items, much like traditional inventory items, may be pieces of software code or other data that may be rendered within a virtual universe. Shared inventory items may be stored in any type of inventory source, including a universe database 110, a client computer system 106, a virtual inventory manager central inventory 120, or other location. The universe database 110 and/or virtual inventory manager central inventory 120 may each be stored on any type or combination of storage devices, including volatile or non-volatile storage such as hard drives, storage area networks, memory, fixed or removable storage, or other storage devices.

Users may utilize a client computer system 106 according to the present embodiments to access the virtual universe simulator 102 (and thus the virtual universe) via network 104. Client computer system 106 may be a personal computer system or other computer system adapted to execute computer programs, such as a personal computer, workstation, server, notebook or laptop computer, desktop computer, personal digital assistant (PDA), mobile phone, wireless device, or set-top box, such as described in relation to FIG. 2. A user of the client computer system 106 may utilize a VU interface 112 to interact with the VU operated by the virtual world simulator 102. VU interface 112 may be dedicated client software provided by the VU operator in some embodiments or it may alternatively be existing general software such as a browser. The client computer system 106 may also include an inventory query module 114 for facilitating queries regarding shared inventory items by the user. The inventory query module 114 may be a stand-alone module or partially or fully integrated into a VU interface 112.

Network 104 may be any type of data communications channel or combination of channels, such as the Internet, an intranet, a Local Area Network (LAN), a Wide Area Network (WAN), an Ethernet network, a wireless network, telephone network, a proprietary network, or a broadband cable network. In one example, the Internet may serve as network 104 and the client computer systems 106, the virtual inventory manager 108, and the virtual universe simulator 102 may communicate via the Internet using known protocols. Those skilled in the art will recognize, however, that the invention described herein may be implemented utilizing any type or combination of data communications channel(s) without departure from the scope and spirit of the invention.

The shared inventory tracking system 100 may use any methodology to implement sharing of inventory items. In the depicted embodiments, sharing of inventory items is implemented by the virtual inventory manager 108 which manages shared inventory items for one or more virtual universe simulators 102 (and thus one or more virtual universes). In some embodiments, the virtual inventory manager 108 may facilitate the copying of a shared inventory item from an inventory source to the virtual universe simulator 102 when the shared inventory item is requested. The shared inventory items may be represented as pointers or references to the shared inventory item that is stored at a remote inventory source. The virtual inventory manager 108 may be considered an abstraction layer between traditional means of connecting data among servers and a virtual universe simulator-specific graphical user interface (GUI). The means of connecting data among servers may include network file system (NFS) applications, structured query language (SQL), file transfer protocol (ftp), a services-oriented architecture (SOA) request, or other methodologies. By facilitating such copying, the virtual inventory manager 108 allows the virtual universe simulator 102 to avoid having to store a copy of a shared inventory item for each instance of a user having rights to the item. When the user checks her inventory (or at an earlier time) that includes a shared inventory item, the virtual inventory manager 108 may in effect access the remote shared inventory item and provide that shared inventory item to the virtual universe simulator 102, which may in turn render the inventory item to the user. From the point of the view of the user, it will appear in this example as if the item had been in her inventory all along. The virtual inventory manager 108 may also optionally cache some or all shared inventory items and query inventory sources periodically for new or updated items in order to improve its efficiency.

The virtual inventory manager 108 may optionally include a VIM central inventory database 120 to store shared inventory items related information. The VIM central inventory database 120 may be particularly useful for situations where a virtual universe operator does not want to manage shared resources or for when inventory items may be shared across multiple virtual universes. A user may, for example, wish to use and share inventory items in multiple virtual universes to which they belong and a centralized database to store such items may provide efficiency benefits.

Figure 3:
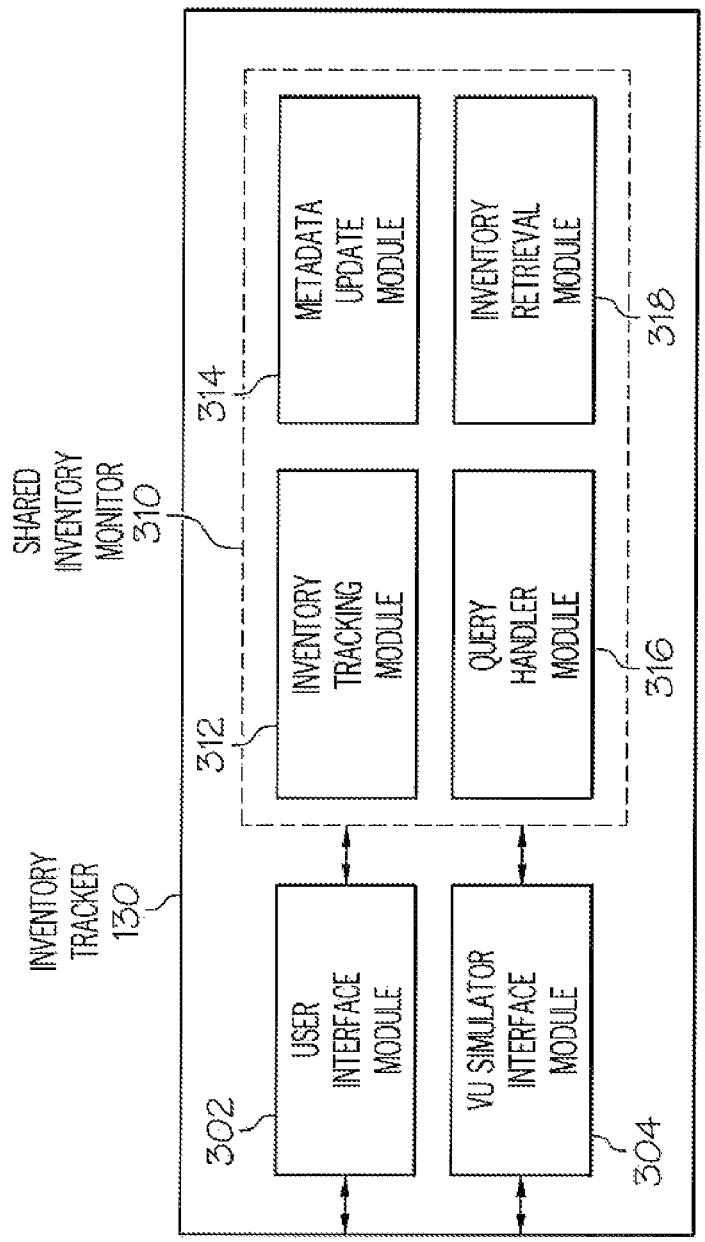
FIG. 3 depicts a conceptual illustration of software components of a shared inventory tracker according to some embodiments.

The shared inventory tracker 130, as described in more detail in FIG. 3, may provide for tracking, finding, and/or receiving shared inventory items in a virtual universe. The shared inventory tracker 130 may be implemented as a stand-alone entity (so that it can serve multiple virtual universes or virtual inventory managers 108) or as an integrated part of a component such as a virtual inventory manager 108. The shared inventory tracker 130 may, according to various embodiments, track usage of borrowed shared inventory items, recall a borrowed shared inventory item, respond to user queries for information relating to available shared inventory items, provide status updates to owners of shared inventory items, or provide other functions.

Various non-limiting examples may serve to further illustrate the disclosed shared inventory tracking system 100. In one example, a virtual universe user may utilize an inventory query module 114 to request a list of available shared inventory items that meet their criteria (e.g., free, wearable, and rated by users with three or more stars) and then be provided the results of the query. The user may then optionally select a shared inventory item from the list to borrow and use within the virtual universe. This allows a user to fine-tune their search request so that they may more easily find desirable shared inventory items to borrow.

In another example, a user may decide to she wants to search and retrieve items that she lent or gave to others as shared inventory items. She may first request a search of her loaned shared inventory items and may perform various options for each. For some items, she may decide that she wants to recall all of its shared inventory items that have been loaned out. The disclosed shared inventory tracker 130 may find and recall the borrowed shared inventory items, returning each to the original owner. For other items, she may request that the items be returned, such as when recall is prohibited or if she does not want to upset any recipients. Other items may have been passed to other users after the first borrower, and the disclosed shared inventory tracker 130 may facilitate recovery and tracking of those items. By providing for the ability to track and possibly recall shared inventory items, the shared inventory item technology may prove more attractive to many users as they can retain control over an item if they later change their mind or they can set up time limits or other constraints offering the item for a loan.

In other examples, an automatic recall may be configured for particular shared inventory items, such as by automatically recalling an item if a borrowing user leaves a particular geographical area or performs a specified action, or if a specified time period expires.

Figure 2:
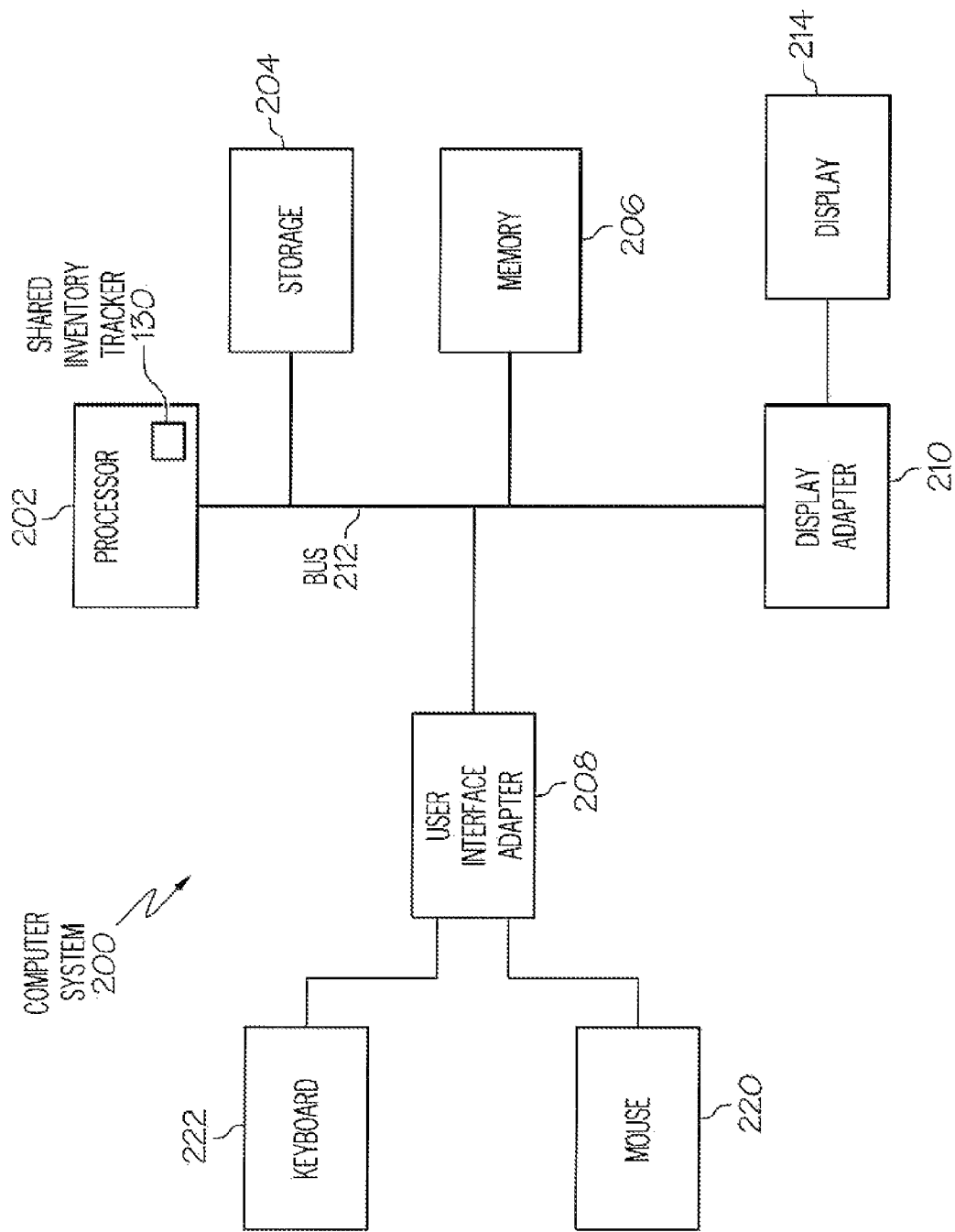
FIG. 2 depicts a block diagram of one embodiment of a computer system suitable for use as a component of the shared inventory tracking system, such as a client computer system or a data processing system to execute the shared inventory tracker.

FIG. 2 depicts a block diagram of one embodiment of a computer system 200 suitable for use as a component of the shared inventory tracking system 100, such as a client computer system 106 or a data processing system to execute the shared inventory tracker 130. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the shared inventory tracker 130, such as by receiving and processing user queries and tracking usage of borrowed shared inventory items, and may temporarily or permanently store information during its calculations or results after calculations in storage 204 or memory 206. All or part of the virtual inventory manager 108, for example, may be stored in memory 206 during execution of its routines. Similarly, processor 202 may execute instructions for the VU interface 112 when computer system 200 is used for a client computer system 106.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a client computer system 106 attempting access to a shared inventory item, for example, may utilize the keyboard 222 and mouse 220 to interact with their computer system. The bus 212 may also connect the processor 202 to a display 214, such as an LCD display or CRT monitor, via the display adapter 210.

FIG. 3 depicts a conceptual illustration of software components of a shared inventory tracker 130 according to some embodiments. The shared inventory tracker 130 may be implemented on a computer system 200 such as described in relation to FIG. 2, including on one or more servers. As described previously and also in relation to FIGS. 4 and 5, the shared inventory tracker 130 may track shared inventory items and perform other associated tasks for one or more virtual universes. The shared inventory tracker 130 may include components to assist it with its functions, including a user interface module 302, a VU simulator interface module 304, and a shared inventory monitor 310. The shared inventory monitor 310 may include its own components, such as an inventory tracking module 312, a metadata update module 314, a query handler module 316, and an inventory retrieval module 318. One of ordinary skill in the art will recognize that the functionality of each component of the shared inventory tracker 130 may be combined or divided in any fashion and the description herein is merely intended to be illustrative of some embodiments.

The user interface module 302 may facilitate communication to and from a client computer system 106 of a user, including transmitting and receiving information associated with queries for shared inventory items. For example, a user may request (and the user interface module 302 may receive) a query be performed to provide a list of available shared inventory items that can be borrowed and that meet user-specified parameters, such as by limiting the type, cost, features, or other aspect of shared inventory items. The VU simulator interface module 304 may facilitate communication to and from virtual universe simulators 102, such as by receiving usage information for a particular shared inventory item or indications that users have borrowed shared inventory items or by transmitting a request to recall a shared inventory item. Communication between a VU simulator interface module 304 and a virtual universe simulator 102 may be via a virtual inventory manager 108 according to some embodiments.

The shared inventory monitor 310, and its components, may communicate with the two interface modules to assist it in performing its task of tracking borrowed shared inventory items and performing associated tasks. The inventory tracking module 312 may track usage of borrowed shared inventory items by borrowing users. Tracked usage may include the beginning and end of borrowing of a shared inventory item, the nature, extent, and duration of the use, or any other type of information. The metadata update module 314 may determine and store metadata associated with borrowing of shared inventory items, such as by modifying metadata for a particular borrowed shared inventory item based on tracked usage of the particular item. The metadata update module 314 may optionally perform its tasks in conjunction with the inventory tracking module 312. In one example, the metadata update module 314 may determine new metadata to reflect that a user has borrowed a shared inventory item so that future queries properly reflect the correct status of the borrowed item. In another example, the metadata update module 314 may record the duration of borrowing or the geographical location of the borrowed item in the virtual universe.

Metadata for shared inventory items may assist in controlling or limiting access to the shared inventory items and may be associated with a particular inventory item using any type of methodology. Metadata may, for example, mark an item for sharing by all, may mark the item for sharing with particular users, mark the item for sharing for particular users, etc. In other examples, metadata may mark an item for auction, barter, or other means of sharing items. In yet another example, metadata may mark an inventory item by a rating, such as a compilation of user ratings for the item. This example may be useful in facilitating a user searching for inventory items that meet a desired standard of quality or popularity (e.g., a user may request all "five star" or "10 out of 10" rated items). The metadata may be persisted to a database (such as the inventory source of the item or a separate metadata database) and may also be used for visual indication of whether an object is available for sharing. The use of metadata may allow a virtual inventory manager 108 to offer a variety of services. One service may provide for scheduling policies where the metadata includes an indication of a sharing scheduling policy that provides for use of a particular shared inventory item by different users at different times. An inventory owner may thus state that her items may be shared for predefined blocks of time (e.g., shared when owner not logged on, shared every evening between 6 and 10 p.m., etc.). Another service may provide for access control lists (ACLs) that allow owners to set up ACLs around which other members of the virtual universe may access the sharing status of a particular inventory item. Another inventory service the metadata manager module 318 may implement would include management of expiration of borrowing terms, such as by specifying a borrow time for an item. When the borrow time expires, a pop-up window or other notification could be used and renewal options could optionally be provided.

The query handler module 316 may receive and process queries requesting performance of actions relating to shared inventory items and to perform requested actions. In one example, the received query may be a query request to recall a borrowed shared inventory item and the performed action may be instructing the inventory retrieval module 318 to recall the borrowed shared inventory item. In another example, the received query may be a query request from a virtual universe user to search shared inventory items and the performed action may be performing the query for the user and providing the results. In yet another example, the received query may be a query request from an associated item owner for a status update of a particular shared inventory item and the performed action may be generating and transmitting the status. The inventory retrieval module 318 may recall a borrowed shared inventory item and return it to an item owner associated with the borrowed shared inventory item. In some embodiments, the inventory retrieval module 318 may perform a recall upon request of the item owner (via the query handler module 316) while in other embodiments it may perform a recall upon the occurrence of various conditions such as the expiration of a time period (e.g., an item can be borrowed only for one hour), movement out of a geographic region, or other event.

The query handler module 316 may perform other types of actions as well in addition to recalling an item, performing a search, or providing a status update. The query handler module 316 may, for example, provide a warning to a borrowing user that a shared inventory item will soon be recalled or that the shared inventory item is being used improperly. In another example, the query handler module 316 may provide an offer to a user that the user may purchase the shared inventory item for a specified price and thus convert the item from a "borrowed" one to an "owned" one. In yet another example, the query handler module 316 may receive requests for assistance from a user and provide help to the user via help files, automated assistance, manned chat lines, etc. Indications provided to users may be style of communication, including graphical forms (e.g., text messages or coloration changes), audio forms (e.g., a recorded message that is heard), or any other type of communication.

Figure 4:
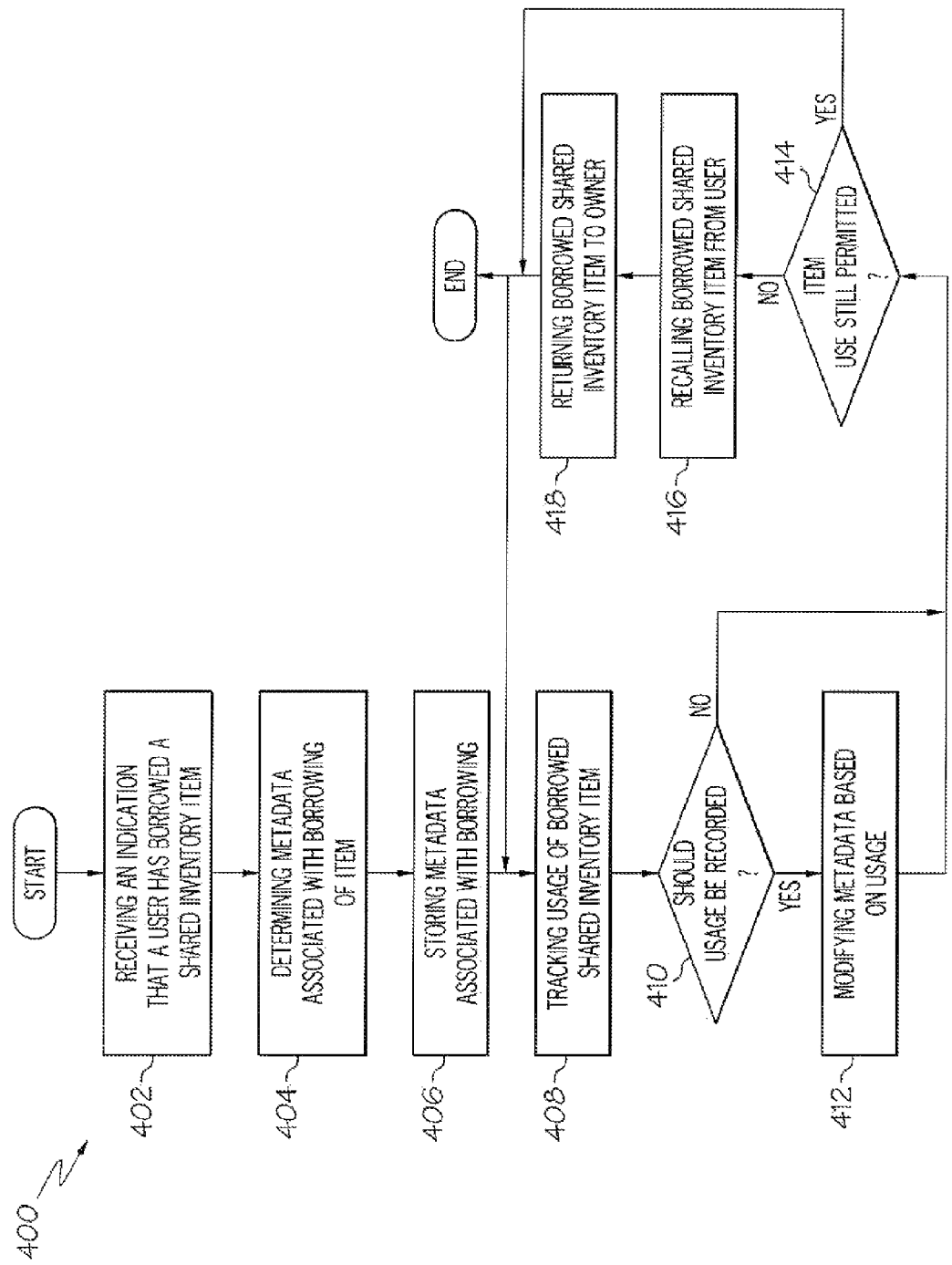
FIG. 4 depicts an example of a flow chart for tracking a borrowed shared inventory item in a virtual universe according to some embodiments.

FIG. 4 depicts an example of a flow chart 400 for tracking a borrowed shared inventory item in a virtual universe according to some embodiments. The method of flow chart 400 may be performed, in one embodiment, by the shared inventory tracker 130. Flow chart 400 begins with element 402, receiving an indication that a user has borrowed a shared inventory item. At element 404, the metadata update module 314 may determine any metadata associated with the borrowing of the shared inventory item and may then, at element 406, store the metadata associated with the borrowing, such as in a persistent store. In this fashion, future queries of the borrowed shared inventory item will reflect that the item has been borrowed by the requesting user, which may limit the ability of other users to also borrow the item. Borrowing metadata may include information such as what item was shared, when the item was shared, who it was shared to, whether the item was given away or only loaned, or other information.

The inventory tracking module 312 may track usage of borrowed shared inventory items by users. Item usage may include information such as whether and when an item was returned, whether the user passed the borrowed item to another user, the geographical location of the borrowed item, actions performed by the user using the borrowed item, or any other information. The inventory tracking module 312 may at decision block 410 determine whether particular usage information should be recorded and, if so, the metadata update module 314 may at element 412 modify the metadata based on the new usage information. In this fashion, the current status of a borrowed shared inventory item may be kept current in the metadata.

At decision block 414, the shared inventory tracker 130 may determine whether use of a particular borrowed shared inventory item is still permitted. If it is not, the method may terminate or return to element 408 for continued tracking. If further use is not permitted (such as after a request to recall the item or expiration of a borrowing term), the inventory retrieval module 318 may at element 416 recall the borrowed shared inventory item from the user and, at element 418, return the borrowed shared inventory item to its owner as applicable, after which the method either terminates or returns to element 408 for further tracking. The methodology of elements 414-418 allows item owners to withdraw borrowing privileges for a shared inventory item for which they retain such control.

One of ordinary skill in the art will recognize that any type of "trigger" or condition may be set to initiate a recall (or any other action the shared inventory tracker 130 may take, such as notifications or status reports). Example conditions for action may include the expiration of a time period, the time of day, the day of week, use of a shared inventory item a specified number of times (e.g., an item that may be used 5 times), using the item in a particular geographical location (e.g., recall item if used on a certain island), using the item outside a particular geographical location (e.g., can only use the item within a theme park), the presence or lack thereof of other avatars (e.g., should not be exposed to other individuals or members of a particular company), the virtual universe load (e.g., limiting items with high computational resource requirements to off-peak times), the purpose of the borrowing user (e.g., limit the ability to cause mischief or disrupt business), or any other condition.

Figure 5:
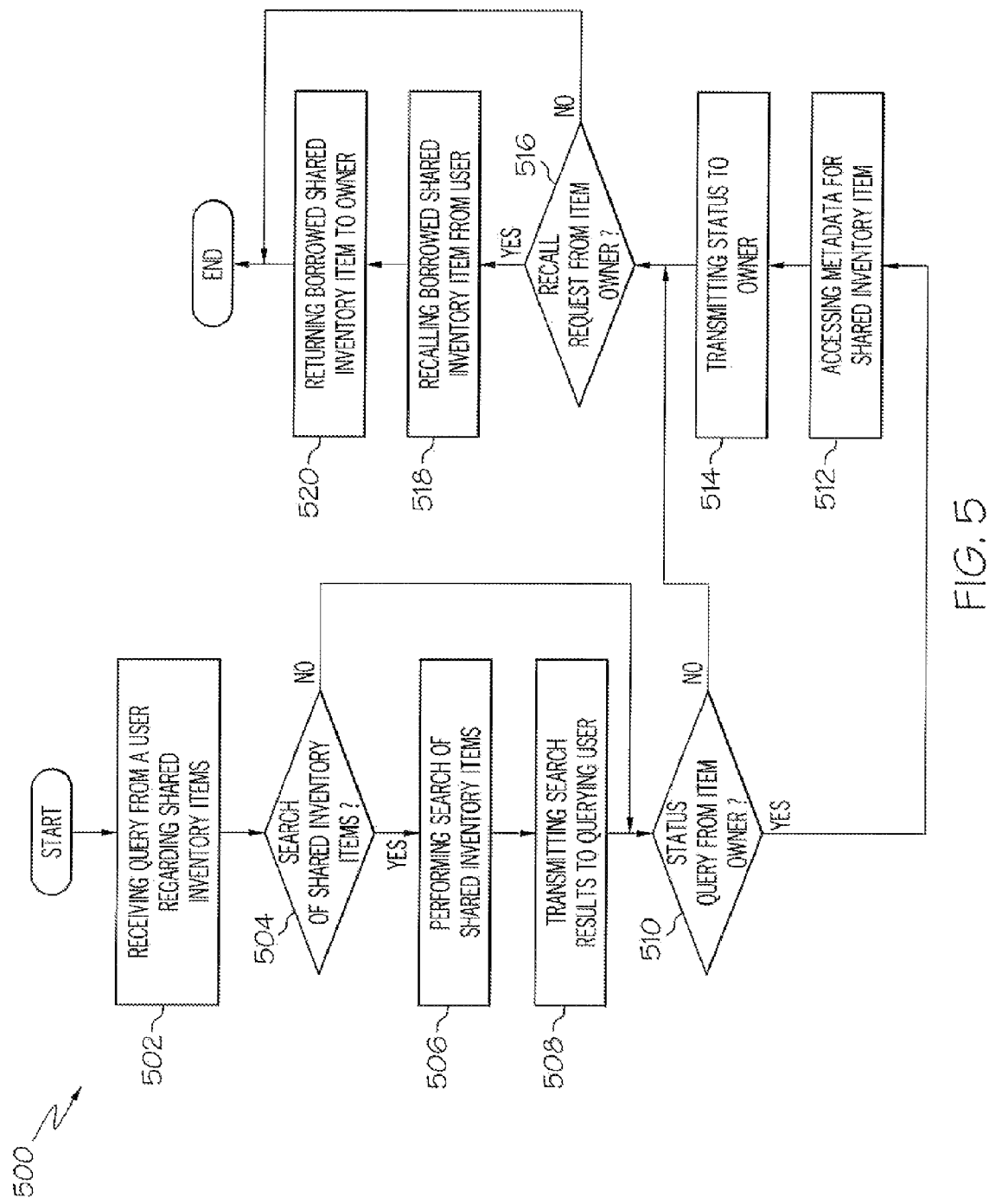
FIG. 5 depicts an example of a flow chart for receiving and processing a query and performing an action according to some embodiments.

FIG. 5 depicts an example of a flow chart 500 for receiving and processing a query and performing an action according to some embodiments. The method of flow chart 500 may be performed, in one embodiment, by the shared inventory tracker 130. Flow chart 500 begins with element 502, receiving a query from a user regarding shared inventory items. Three example queries and responsive actions are described in FIG. 5, and one of ordinary skill in the art will recognize that any combination of these three as well as any other queries or actions may also be performed consistent with the disclosed embodiments.

If, at decision block 504, the received query is a request for a search of shared inventory items, the query handler module 316 may at element 506 perform a search of shared inventory items and, at element 508, transmit search results to the querying user. Example user queries may include requests to know what items are currently on loan and what items are available, what items have been given away, which avatar to contact in case the user would like to use a shared item herself, which avatar to contact in case the user would like to request that a donated item be returned, or other queries. Users may request such queries in order to find out which shared inventory items they desire to borrow.

If, at decision block 510, the received query is a status request from an item owner, the query handler module 316 may at element 512 access metadata for the shared inventory item and, at element 514, transmit status information to the owner based on the metadata. Status metadata for a shared inventory item may include what item was shared or given away, when it was shared or given away, when it was returned, conditions of borrowing, who it was shared to, who the original borrower may have transferred the item to, whether the item was given away or just loaned, or any other type of information. In this fashion, an item owner may efficiently track their shared inventory items and their use by borrowers.

If, at decision block 516, the received query is a recall request from an item owner, the query handler module 316 (along with the inventory retrieval module 318) may recall the borrowed shared inventory item from the user at element 518 and, at element 520, return the borrowed shared inventory item to its owner, after which the method terminates.

FIG. 6 depicts an example of a flow chart 600 for requesting a query and receiving results according to some embodiments. The method of flow chart 600 may be performed, in one embodiment, by components of the shared inventory tracking system 100 such as an inventory query module 114 of a client computer system 106. Flow chart 600 may represent the requestor of the queries discussed in relation to FIG. 5. Flow chart 600 begins with element 602, receiving a request from a user to search for shared inventory items. A user may make such request if, for example, they are looking for shared inventory items to borrow. The inventory query module 114 may, at element 604, transmit a request to search for the shared inventory items based on the user request and may also, at element 606, receive the search results and present them to the user.

The shared inventory tracker 130 may at element 608 receive a request for status from an owner of a shared inventory item. The item owner may make such request through an inventory query module 114 according to some embodiments. At element 610, the request is transmitted and at element 612 an indication of status for the shared inventory item is received and may be presented to the requesting owner. An owner of a shared inventory item may also wish to recall the borrowed item in order to regain control over it and to end the borrowing by a user. At element 614, a request from an owner to recall a shared inventory item may be received and such request may be transmitted to a shared inventory tracker 130 at element 616. The inventory query module 114 (or other interface) may receive an indication that the shared inventory item was successfully recalled at element 618, after which the method may terminate.

It will be apparent to those skilled in the art having the benefit of this disclosure that the present invention contemplates methods, systems, and media for tracking shared inventory items in a virtual universe. It is understood that the form of the invention shown and described in the detailed description and the drawings are to be taken merely as examples. It is intended that the following claims be interpreted broadly to embrace all the variations of the example embodiments disclosed.

What is claimed is:

1. A method for tracking shared inventory in a virtual universe, the method comprising:
   in response to a shared inventory item being requested, facilitating, by a virtual universe simulator that manages the virtual universe, a copying of the shared inventory item from an inventory source of the shared inventory item to the virtual universe simulator;
   avoiding, by the virtual universe simulator, having to store a copy of the shared inventory item for each instance of a user having rights to the shared inventory item, said avoiding being enabled by and a consequence of said facilitating, said shared inventory item comprising software code being renderable to each instance of the user having rights to the shared inventory item;
   receiving, by one or more processor of a computer system, communicated indications that a plurality of different users of the virtual universe have borrowed the shared inventory item in accordance with a sharing scheduling policy under which the different users have borrowed the shared inventory item for use at respective different times, said shared inventory item having an associated item owner, wherein the different users are represented by respective avatars in the virtual universe, and wherein the virtual universe is implemented within a computerized communication network selected from the group consisting of an Internet, an intranet, a Local Area Network (LAN), a Wide Area Network (WAN), an Ethernet network, a wireless network, a telephone network, and a broadband cable network;
   said one or more processors determining and storing metadata associated with the borrowed shared inventory item;
   said one or more processors tracking usage of the borrowed shared inventory item by the different users;
   said one or more processors receiving a query requesting performance of an action relating to the borrowed shared inventory item; and
   said one or more processors performing the requested action relating to the borrowed shared inventory item.

2. The method of claim 1, said method further comprising:
   said one or more processors modifying metadata for the borrowed shared inventory item based on tracked usage of the borrowed shared inventory item.

3. The method of claim 2, wherein the modified metadata specifies whether or not one user of the different users passed the borrowed shared inventory item to another user of the different users after the one user borrowed the shared inventory item.

4. The method of claim 1,
   wherein said receiving the query requesting performance of an action relating to the borrowed shared inventory item comprises receiving a request from a virtual universe user to search shared inventory items, and
   wherein said performing the requested action relating to the borrowed shared inventory item comprises performing a search of shared inventory items based on the request and transmitting search results to a source of the querying.

5. The method of claim 4, wherein the request to search comprises a request to search for an identification of which avatar to contact with respect to the shared inventory item.

6. The method of claim 1, wherein said performing the requested action relating to the borrowed shared inventory item comprises performing the requested action in response to a condition of action being satisfied.

7. The method of claim 6, wherein the condition of action is selected from the group consisting of expiration of a time period, a time of day, a day of week, use of the borrowed shared inventory item a specified number of times, using the borrowed shared inventory item in a particular geographical location, using the borrowed shared inventory item outside a particular geographical location, a presence of specified avatars, an absence of specified avatars, and a purpose of one user of the different users who has borrowed the shared inventory item.

8. The method of claim 7, wherein the computerized communication network is the Internet.

9. A computer program product, comprising:
one or more computer readable hardware storage devices having computer readable program code stored therein, said program code containing instructions executable by one or more processors of a computer system to implement a method for tracking shared inventory in a virtual universe, said method comprising:
in response to a shared inventory item being requested, facilitating, by a virtual universe simulator that manages the virtual universe, a copying of the shared inventory item from an inventory source of the shared inventory item to the virtual universe simulator;
avoiding, by the virtual universe simulator, having to store a copy of the shared inventory item for each instance of a user having rights to the shared inventory item, said avoiding being enabled by and a consequence of said facilitating, said shared inventory item comprising software code being renderable to each instance of the user having rights to the shared inventory item;
said one or more processors receiving communicated indications that a plurality of different users of the virtual universe have borrowed the shared inventory item in accordance with a sharing scheduling policy under which the different users have borrowed the shared inventory item for use at respective different times, said shared inventory item having an associated item owner, wherein the different users are represented by respective avatars in the virtual universe, and wherein the virtual universe is implemented within a computerized communication network selected from the group consisting of an Internet, an intranet, a Local Area Network (LAN), a Wide Area Network (WAN), an Ethernet network, a wireless network, a telephone network, and a broadband cable network;
said one or more processors determining and storing metadata associated with the borrowed shared inventory item;
said one or more processors tracking usage of the borrowed shared inventory item by the different users;
said one or more processors receiving a query requesting performance of an action relating to the borrowed shared inventory item; and
said one or more processors performing the requested action relating to the borrowed shared inventory item.

10. The computer program product of claim 9, said method further comprising:
said one or more processors modifying metadata for the borrowed shared inventory item based on tracked usage of the borrowed shared inventory item.

11. The computer program product of claim 10, wherein the modified metadata specifies whether or not one user of the different users passed the borrowed shared inventory item to another user of the different users after the one user borrowed the shared inventory item.

12. The computer program product of claim 9,
wherein said receiving the query requesting performance of an action relating to the borrowed shared inventory item comprises receiving a request from a virtual universe user to search shared inventory items, and
wherein said performing the requested action relating to the borrowed shared inventory item comprises performing a search of shared inventory items based on the request and transmitting search results to a source of the querying.

13. The computer program product of claim 12, wherein the request to search comprises a request to search for an identification of which avatar to contact with respect to the shared inventory item.

14. The computer program product of claim 9, wherein said performing the requested action relating to the borrowed shared inventory item comprises performing the requested action in response to a condition of action being satisfied.

15. The computer program product of claim 14, wherein the condition of action is selected from the group consisting of expiration of a time period, a time of day, a day of week, use of the borrowed shared inventory item a specified number of times, using the borrowed shared inventory item in a particular geographical location, using the borrowed shared inventory item outside a particular geographical location, a presence of specified avatars, an absence of specified avatars, and a purpose of one user of the different users who has borrowed the shared inventory item.

16. A computer system, comprising:
one or more processors,
one or more memories, and
one or more computer readable hardware storage devices, said one or more hardware storage device containing program code executable by the one or more processors via the one or more memories to implement a method for tracking shared inventory in a virtual universe, said method comprising:
in response to a shared inventory item being requested, facilitating, by a virtual universe simulator that manages the virtual universe, a copying of the shared inventory item from an inventory source of the shared inventory item to the virtual universe simulator;
avoiding, by the virtual universe simulator, having to store a copy of the shared inventory item for each instance of a user having rights to the shared inventory item, said avoiding being enabled by and a consequence of said facilitating, said shared inventory item comprising software code being renderable to each instance of the user having rights to the shared inventory item;
said one or more processors receiving communicated indications that a plurality of different users of the virtual universe have borrowed the shared inventory item in accordance with a sharing scheduling policy under which the different users have borrowed the shared inventory item for use at respective different times, said shared inventory item having an associated item owner, wherein the different users are represented by respective avatars in the virtual universe, and wherein the virtual universe is implemented within a computerized communication network selected from the group consisting of an Internet, an intranet, a Local Area Network (LAN), a Wide Area Network (WAN), an Ethernet network, a wireless network, a telephone network, and a broadband cable network;

said one or more processors determining and storing metadata associated with the borrowed shared inventory item;

said one or more processors tracking usage of the borrowed shared inventory item by the different users;

said one or more processors receiving a query requesting performance of an action relating to the borrowed shared inventory item; and said one or more processors performing the requested action relating to the borrowed shared inventory item.

17. The computer system of claim 16, said method further comprising: said one or more processors modifying metadata for the borrowed shared inventory item based on tracked usage of the borrowed shared inventory item.

18. The computer system of claim 17, wherein the modified metadata specifies whether or not one user of the different users passed the borrowed shared inventory item to another user of the different users after the one user borrowed the shared inventory item.

19. The computer system of claim 16,
wherein said receiving the query requesting performance of an action relating to the borrowed shared inventory item comprises receiving a request from a virtual universe user to search shared inventory items, and
wherein said performing the requested action relating to the borrowed shared inventory item comprises performing a search of shared inventory items based on the request and transmitting search results to a source of the querying.

20. The computer system of claim 19, wherein the request to search comprises a request to search for an identification of which avatar to contact with respect to the shared inventory item.

21. The computer system of claim 16, wherein said performing the requested action relating to the borrowed shared inventory item comprises performing the requested action in response to a condition of action being satisfied.

22. The computer system of claim 21, wherein the condition of action is selected from the group consisting of expiration of a time period, a time of day, a day of week, use of the borrowed shared inventory item a specified number of times, using the borrowed shared inventory item in a particular geographical location, using the borrowed shared inventory item outside a particular geographical location, a presence of specified avatars, an absence of specified avatars, and a purpose of one user of the different users who has borrowed the shared inventory item.

* * * * *